Figure 1:
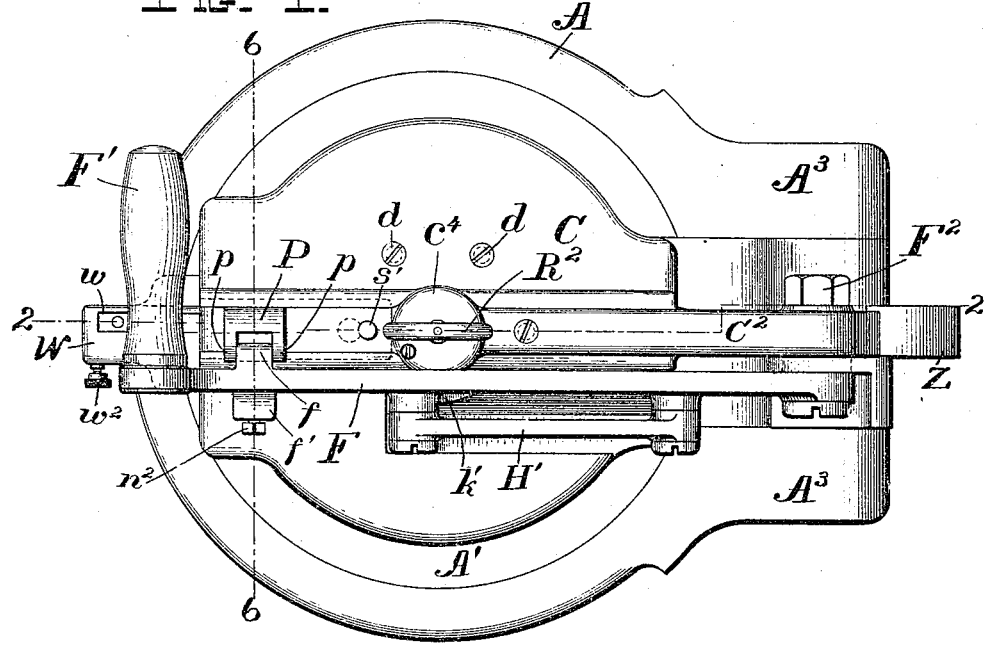

No. 637,110. Patented Nov. 14, 1899.
F. J. HAESELER.
BREECH LOADING ORDNANCE.
(Application filed Apr. 15, 1899.)
(No Model.) 8 Sheets—Sheet 1.

Witnesses
Percy C. Bowen
John N. Hall

Inventor
F. J. Haeseler,
by Wilkinson & Fisher,
Attorneys

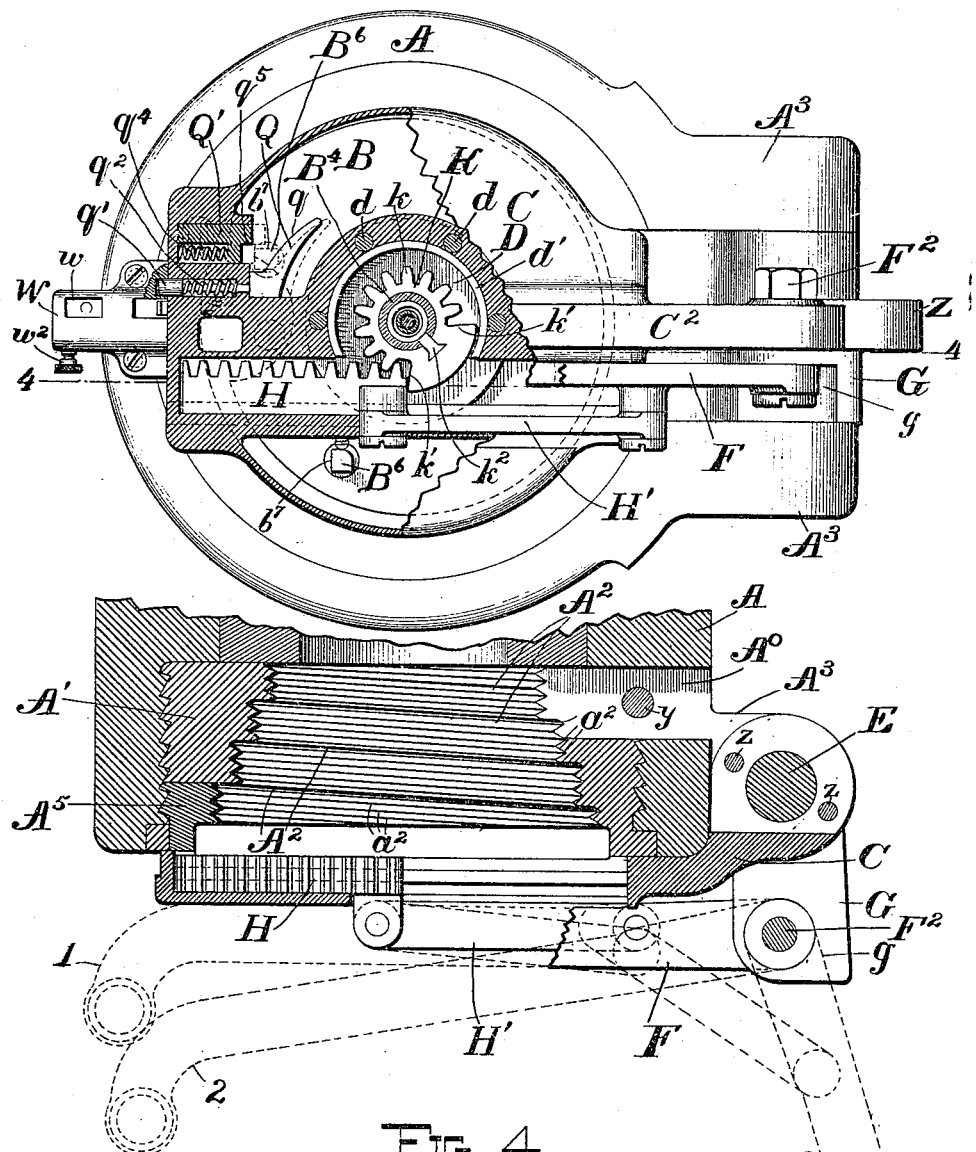

No. 637,110. Patented Nov. 14, 1899.
F. J. HAESELER.
BREECH LOADING ORDNANCE.
(Application filed Apr. 15, 1899.)
(No Model.) 8 Sheets—Sheet 3.

Witnesses
Percy C. Bowen
John H. Helf

Inventor
F. J. Haeseler,
by Wilkinson & Fisher
Attorneys

No. 637,110. Patented Nov. 14, 1899.
F. J. HAESELER.
BREECH LOADING ORDNANCE.
(Application filed Apr. 15, 1899.)
(No Model.) 8 Sheets—Sheet 4.
Fig. 7.
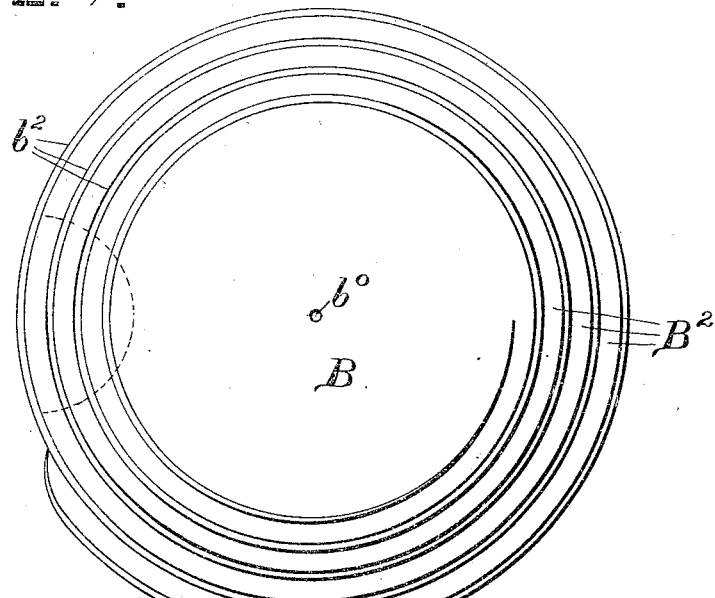
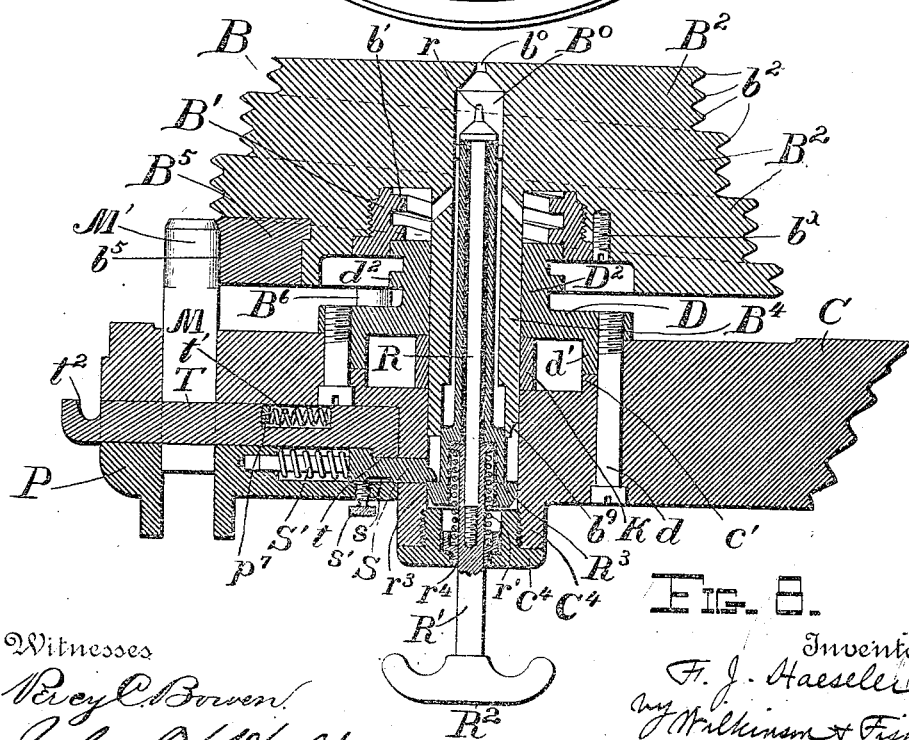
Fig. 8.
Witnesses
Percy C. Bowen
John N. Holt
Inventor
F. J. Haeseler
by Wilkinson & Fisher
Attorneys.

No. 637,110. Patented Nov. 14, 1899.
F. J. HAESELER.
BREECH LOADING ORDNANCE.
(Application filed Apr. 15, 1899.)
(No Model.) 8 Sheets—Sheet 5.
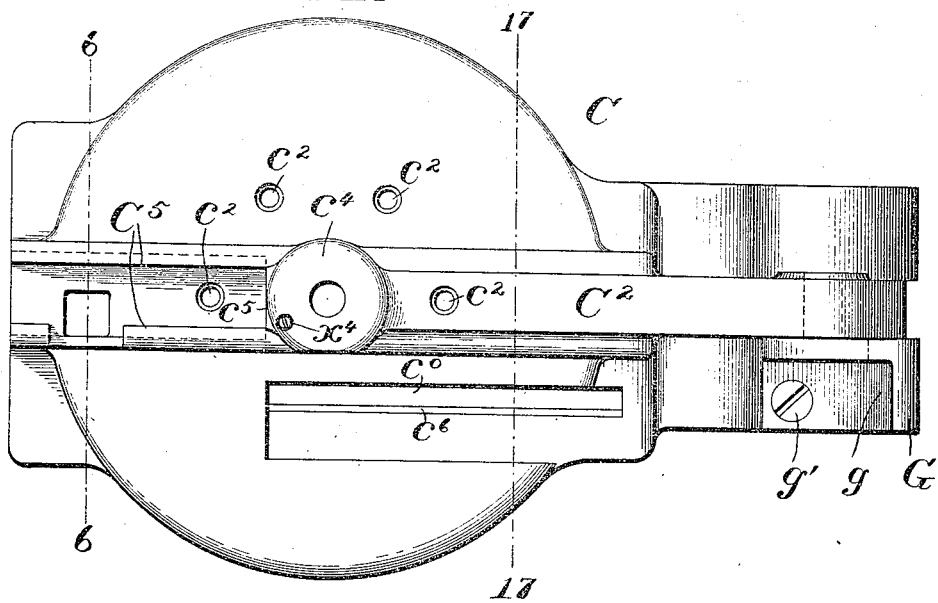
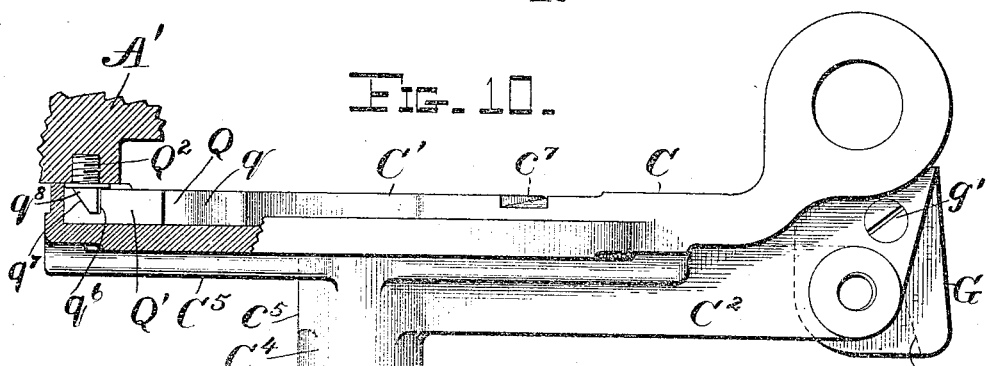
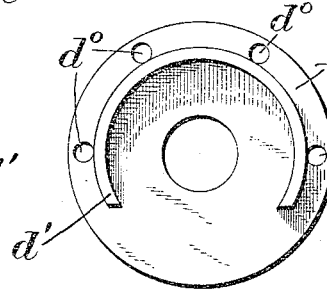
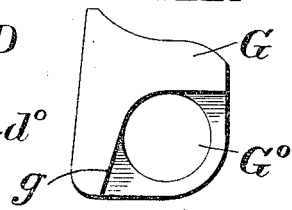
Witnesses
Inventor
F. J. Haeseler,
by Wilkinson & Fisher
Attorneys No. 637,110. Patented Nov. 14, 1899.
F. J. HAESELER.
BREECH LOADING ORDNANCE.
(Application filed Apr. 15, 1899.)
(No Model.) 8 Sheets—Sheet 6.

Witnesses
Percy C. Bowen
John H. Nalt

Inventor
F. J. Haeseler,
by Wilkinson & Fisher,
Attorneys.

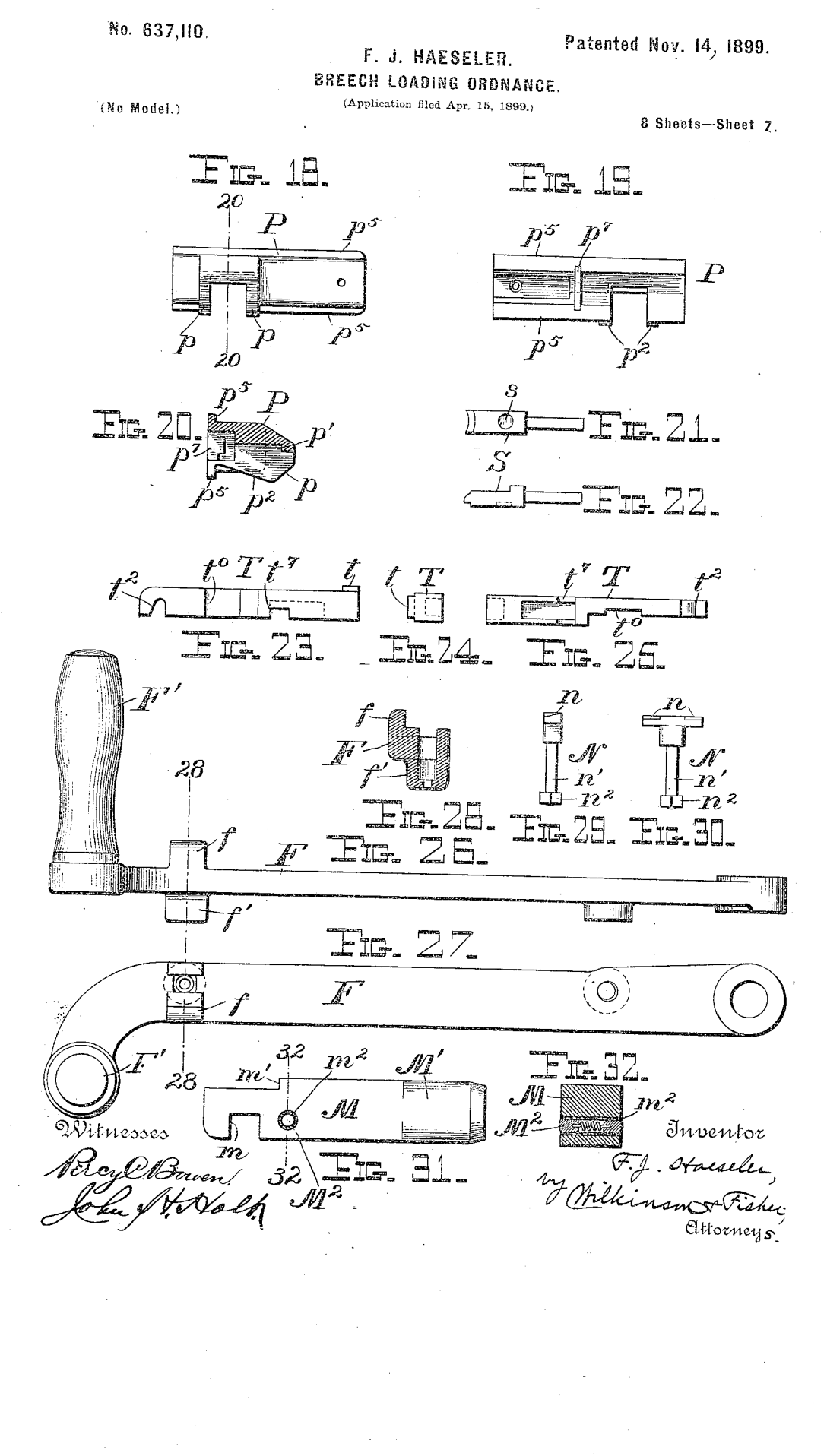

No. 637,110. Patented Nov. 14, 1899.
F. J. HAESELER.
BREECH LOADING ORDNANCE.
(Application filed Apr. 15, 1899.)
(No Model.) 8 Sheets—Sheet 7.

No. 637,110. Patented Nov. 14, 1899.
F. J. HAESELER.
BREECH LOADING ORDNANCE.
(Application filed Apr. 15, 1899.)
(No Model.) 8 Sheets—Sheet 8.
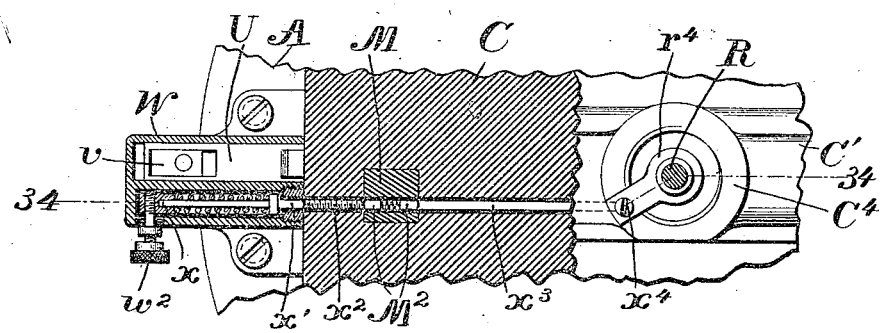
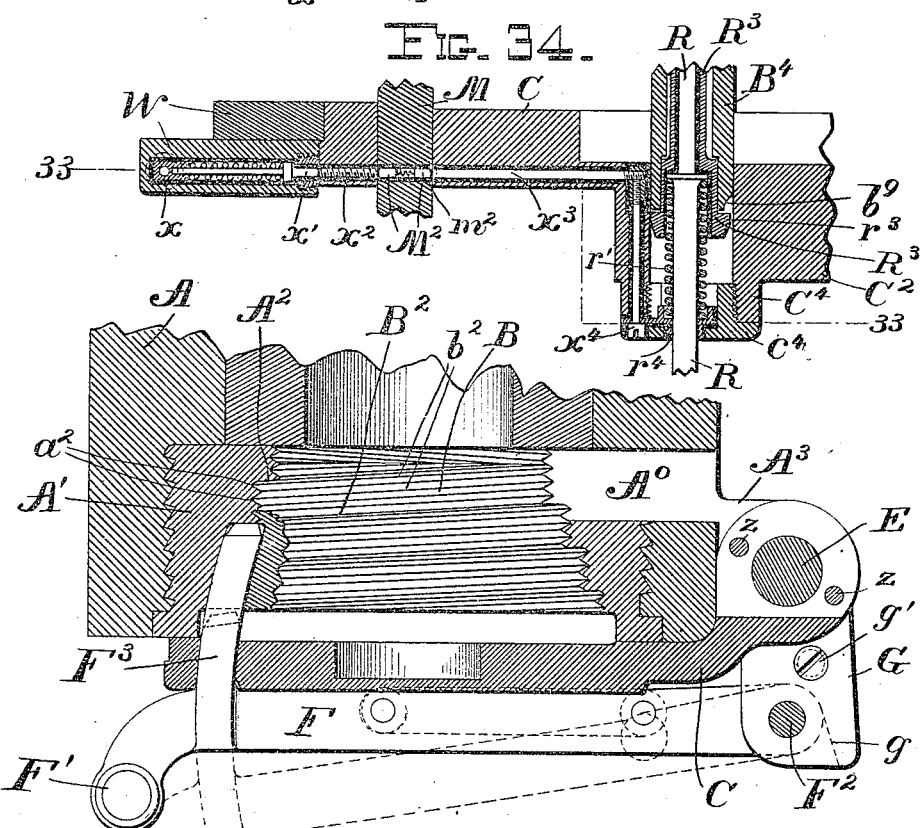
Witnesses Inventor
F. J. Haeseler,
by Wilkinson & Fisher,
Attorneys.

UNITED STATES PATENT OFFICE.

FRANCIS J. HAESELER, OF THE UNITED STATES NAVY.

BREECH-LOADING ORDNANCE.

SPECIFICATION forming part of Letters Patent No. 637,110, dated November 14, 1899.

Application filed April 15, 1899. Serial No. 713,183. (No model.)

*To all whom it may concern:*

Be it known that I, FRANCIS J. HAESELER, a lieutenant in the United States Navy, stationed at the Naval Gun Factory, in the city of Washington, in the District of Columbia, have invented certain new and useful Improvements in Breech-Loading Ordnance; and I do hereby declare the following to be a full, clear, and exact description of the invention, such as will enable others skilled in the art to which it appertains to make and use the same.

My invention relates to a mechanism for opening and closing the breech of a breech-loading gun, which mechanism consists, essentially, of two parts—a breech-plug, with its seat in the screw-box of the gun, and mechanism for rotating said breech-plug to unlock the same for swinging the same out of the way and for returning the same to the locked position. As incidental details of the improvement I include the hinged carrier with mechanism carried thereby for first rotating the said block to unlock the same and for swinging the block a short distance out of the way; also, mechanism carried by said hinged carrier for firing the gun, either by electricity or by mechanical means, part of the firing mechanism being mounted on the breech of the gun.

The principal feature of my invention consists in providing a breech-block substantially conical in general shape, but having for its engaging surface a single flat spiral forming a series of spiral steps, on each of which steps continuous parallel spiral screw-threads are cut, all of the threads being of the same diametral and axial pitch, so that in realty each screw-thread is of the form of a spiral wound around the frustum of a cone. These spiral steps and screw-threads thereon engage corresponding steps and screw-threads in the breech of the gun, and by this arrangement it will only be necessary to turn the breech-block through a comparatively small angle about its axis, so as to have all the threads on the breech-block engaged with all the threads in the screw-box, and since each of these threads is continuous an engagement of all the threads on the block is had with all the threads on the screw-box, thus insuring great strength and enabling a lighter block to be used.

My invention will be understood by reference to the accompanying drawings, in which the same parts are indicated by the same letters throughout the several views.

Figure 2:
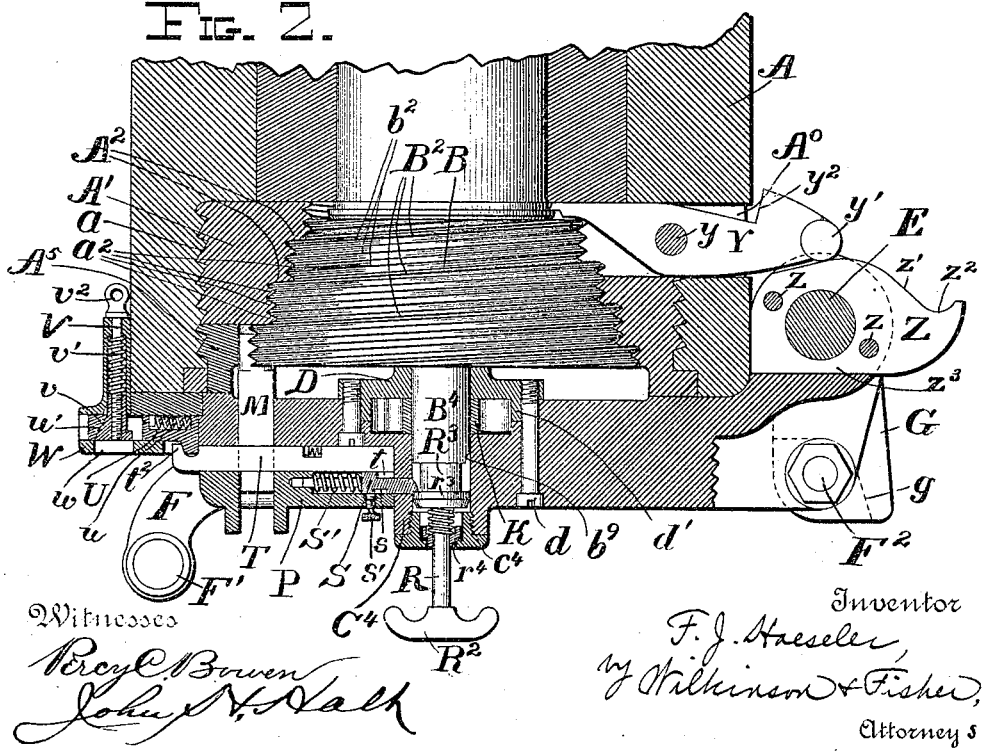
Figure 5:
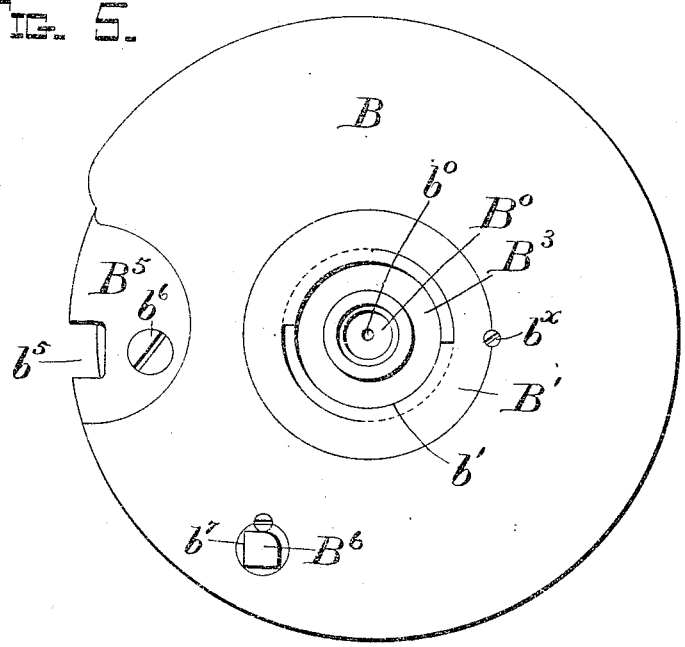
Figure 6:
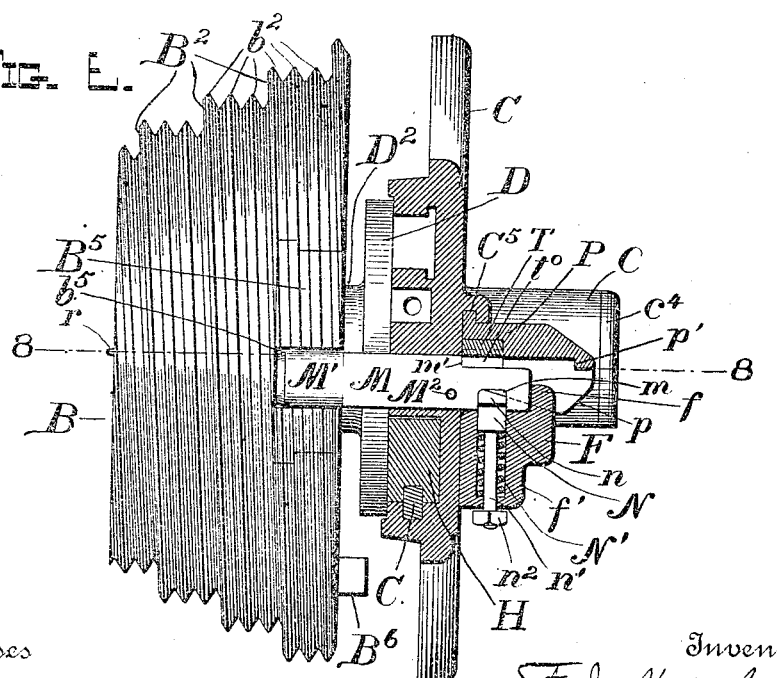
Figure 14:
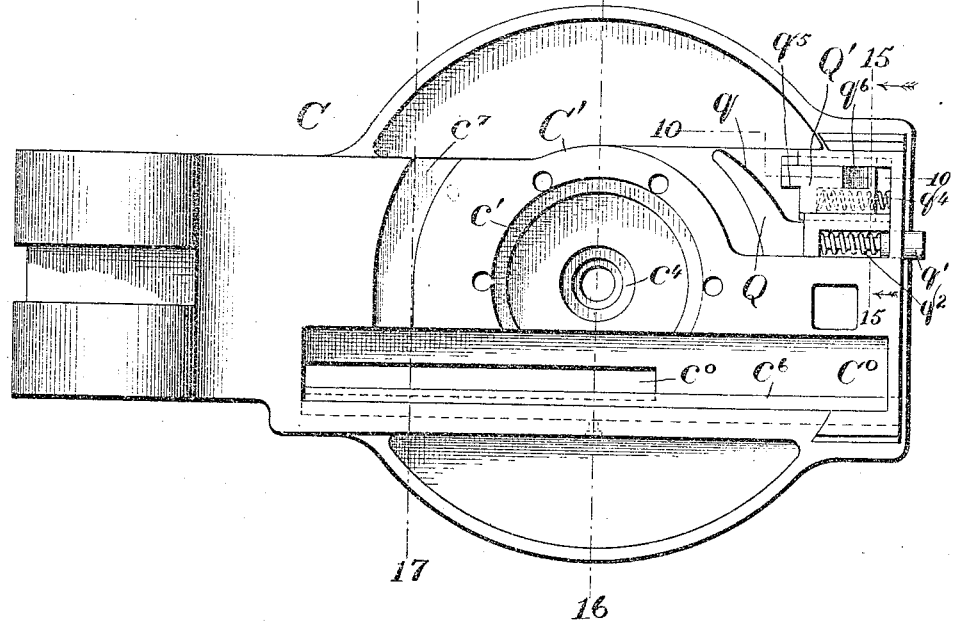
Figures 15, 16, 17:
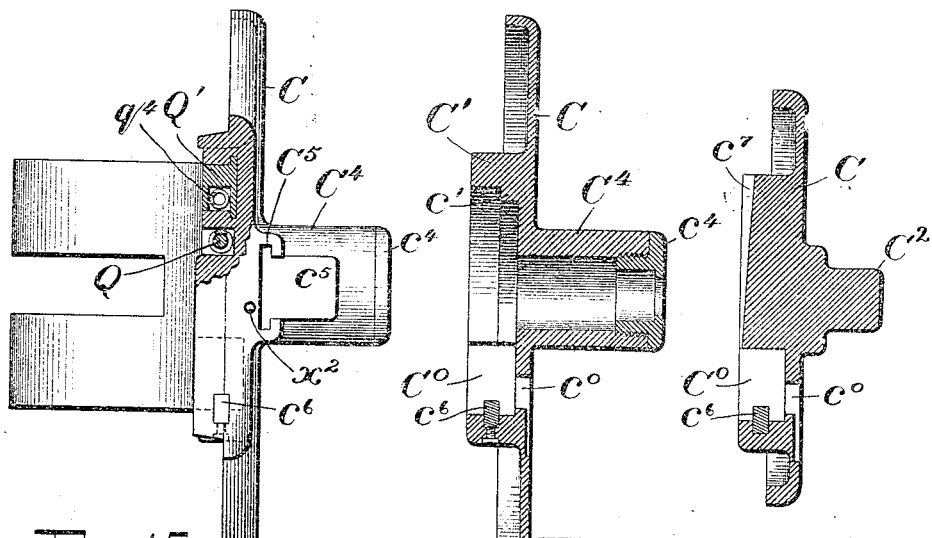

Figure 1 is a rear view of the breech of the gun with the breech closed. Fig. 2 represents a section along the line 2 2 of Fig. 1 and looking down, the breech-block being shown in plan, as also the cartridge-case. Fig. 3 is an elevation of the breech of the gun with the breech closed and with the hinged carrier broken away to show the mechanism for rotating the breech-block about its axis and for locking the same in the hinged carrier when the screw-threads on the block are disengaged from those in the screw-box. It also shows the mechanism for locking the hinged carrier to the gun. Fig. 4 represents a section along the line 4 4 of Fig. 3 and looking down, the breech-block and parts carried thereby being omitted to better illustrate the screw-box and operation of the hand-lever. Fig. 5 is a rear view, on an enlarged scale, of the breech-block as detached from the carrier. Fig. 6 represents a side elevation of the breech-block removed from the gun and shows the carrier in section along the line 6 6 of Fig. 1 and looking to the right of the said figure. Fig. 7 is a front view of the breech-block as detached from the gun. Fig. 8 represents a section along the line 8 8 of Fig. 6 and looking down. Fig. 9 represents a rear view of the hinged carrier with the various other parts of the breech mechanism omitted. Fig. 10 represents a plan view of the hinged carrier, partly in section, along the line 10 10 of Fig. 14. Fig. 11 represents a plan view of the threaded sleeve by means of which the breech-block is connected to the hinged carrier. Fig. 12 represents a rear elevation of the screw-threaded sleeve shown in Fig. 11. Fig. 13 represents an inverted plan view of the stop-lug for the hand-lever, which lug is secured to or made integral with the hinged carrier. Fig. 14 represents a front view of the hinged carrier as detached from the gun, but with the breech-block omitted. Fig. 15 represents an end elevation, partly in section, along the line 15 15 in Fig. 14. Fig. 16 represents a section along the line 16 16 in Fig. 14. Fig. 17 represents a section along the line 17 17 in Fig. 14. Figs. 18, 19, and 20 are detail views showing the housing, in which are mounted the sear and the sliding bar for operating the same, Fig. 20 being in section along the line 20 20 in Fig. 18. Figs. 21 and 22 are detail views of the sear. Figs. 23, 24, and 25 represent the sliding bar for operating the sear. Fig. 26 represents a rear elevation, and Fig. 27 a plan view, of the hand-lever for operating the breech mechanism. Fig. 28 represents a section across the hand-lever along the line 28 28 in Figs. 26 and 27. Figs. 29 and 30 are detail views of the catch for connecting the locking-bar or safety device to the hand-lever. Fig. 31 represents a side elevation of the locking-bar for locking the breech-block against rotation in the screw-box when the breech is closed. Fig. 32 represents a section of the locking-bar along the line 32 32 in Fig. 31. Fig. 33 represents the details of the electrical connections for firing, the same being a section along the broken line 33 33 of Fig. 34. Fig. 34 represents the electrical connections for firing, the same showing a section along the broken line 34 34 of Fig. 33; and Fig. 35 represents a modification in which the breech-block is locked in the screw-box by a tongue or arm projecting forward from the hand-lever.

The drawings are intended to illustrate the invention in the form at present preferred by me, although many changes might be made without departing from the spirit of my invention.

A represents the body of the gun, which may be either itself screw-threaded for the screw-box, as shown at $A^2$, or a housing $A'$ may be screwed into the breech of the gun, as at $a$, and may carry on its interior the screw-threads of the screw-box. These screw-threads are arranged on the surface of one continuous spiral, forming a series of spiral steps $A^2$, on each of which steps are screw-threads $a^2$, which screw-threads register with the screw-threads $b^2$ on the spiral steps $B^2$ of the breech-block B. Each of these threads on the breech-block and also in the screw-box is a continuous spiral and if considered alone would be found in the form of a spiral thread wrapped around the frustum of a cone. Thus when the breech-block is locked in the screw-box all the threads on the breech-block are in engagement with the corresponding threads on the screw-box, and thus great strength is secured.

The gun-body may be provided with ears $A^3$ for the pivot-bolt and with a recess $A^0$ for the extractor in case the gun is to be fitted to fire fixed ammunition. The breech-block is mounted on the hinged carrier C, to which it is revolubly connected, as will now be described.

A sleeve $B'$ is screwed into an annular recess in the rear face of the breech-block, and on the inside of this sleeve are coarse screw-threads $b'$, engaging coarse screw-threads $d^2$ on the annular boss $D^2$ of the sleeve D. The pitch of the threads $b'$ and $d^2$ is such that rotation of the breech-block to the unlocked position will draw the breech-block to the rear relative to the carrier, while the corresponding rotation of the breech-block to the locked position will force the breech-block forward a like distance. In each case the breech-block is so moved that the screw-thread $b^2$ on the breech-block will be in proper position to engage the screw-threads $a^2$ of the screw-box when the hinged carrier is swung against the face of the breech. As soon as the threads $b^2$ and $a^2$ become disengaged the breech-block is supported by the boss $D^2$ and threads $d^2$. I preferably use a sleeve $B'$, screwed into the rear of the block, to avoid wear and facilitate construction of the parts; but it will be obvious that these screw-threads $b'$ may be cut directly into the block itself instead of the sleeve $B'$. Thus this sleeve may be omitted, if desired. Where a sleeve $B'$ is used, it may be locked in place in any convenient way, as by the spline-screw $b^\times$. (See especially Fig. 8.)

The sleeve D (see Figs. 3, 6, 8, and 11) is provided with a segmental rib $d'$, and the said sleeve is secured to the face of the hinged carrier by means of the bolts $d$ passing through the holes $c^2$ in the hinged carrier. Projecting to the rearward from the breech-block is the hollow stem $B^4$, which passes through the sleeve D and projects into a cylindrical recess in the hinged carrier C. This stem serves as a journal for the breech-block and also as a casing for the firing-pin, as shown in Fig. 8.

A block $B^5$ (see Figs. 6 and 8) may be let into the side of the breech-block and provided with a recess $b^5$ for the locking-bolt M, as will be hereinafter described, and the said block if used should be made of hardened material to prevent wear; but, if preferred, this block $B^5$ may be omitted and a recess $b^5$ may be cut into the body of the breech-block itself.

The breech-block is rotated about its axis, so as to lock and unlock the threads $b^2$ and $a^2$ by means of the segmental pinion K, the rack H, the link H', and the hand-lever F, which is pivoted to the hinged carrier and the block G, carried by the same. The hand-lever F is provided with a handle F' at one end thereof and is pivoted at the other end to the bolt $F^2$, supported by the hinged carrier C. This bolt $F^2$ projects through the opening $G^0$ (see Fig. 13) in the block G, which block is secured to the carrier C in any convenient way. This block is undercut and provided with a shoulder $g$, against which the hand-lever F strikes when the said hand-lever has reached the limit of its outward travel, as indicated by the dotted lines numbered 3 in Fig. 4. This block is made separate from the carrier C merely for convenience of manufacture and may be integral with the said carrier, if preferred. The link H' connects the hand-lever F with the rack H, which rack travels in the guideway $C^0$ (see Figs. 6 and 14) in the hinged carrier C and is held in place by the feather $c^6$. The said rack meshes with the teeth $k$ of the segmental pinion K, and this segmental pinion has a key which travels in a slot on the stem of the plug, so as to allow the latter to slide through it as the plug moves longitudinally to the rear, due to the pitch of the screw, but rotates with the plug. The rack is provided with a sector $k'$, projecting beyond the ends of the teeth $k$ and so arranged that when the breech-block is locked in the screw-box one side of this sector $k'$ bears against one side of the rack H below the teeth of the latter, while when the breech-block is open or unlocked from the screw-box the other end of this segment bears against the opposite end of the rack and engages below the teeth of the same. In this way the heavy starting strain of unlocking the breech-block upon the mechanism just described is transferred from the comparatively weak teeth of the sector K and the rack H to the solid segment and the end of the rack, and thus it will be impracticable to injure either the rack or the sector should the strain of starting the block be excessive. In the same way the heavy strain of the initial movement of the block toward its locked position is brought upon the opposite end of the rack and sector. This sector K is secured on the stem $B^4$ in any convenient way, as by means of the feather $k^2$, preferably dovetailed, as shown in Fig. 3.

When the breech-block is locked in the screw-box, the rack H will be in the position shown in Figs. 3 and 4, with the end of the body of the rack H bearing against one side of the segment, as shown in Fig. 3, at which time the hand-lever (broken away in Fig. 3) would be in the position indicated by the dotted lines 1 1 in Fig. 4. Now if the hand-lever be drawn to the rear the link H' would combine with the shorter arm of the hand-lever to form a toggle-joint, which would start the rack very slowly, but under great power, and would consequently give a slow but powerful wrench to the breech-block to unlock the same. As soon as the hand-lever has passed the position indicated by the dotted lines at 2 2 in Fig. 4 the teeth of the rack will begin to engage the teeth of the sector K, and the position of the toggle-joint will enable a quicker velocity of rotation to be imparted to the breech-block. Finally, when the hand-lever reaches the position indicated by the dotted lines at 3 in Fig. 4 the opposite end of the segment $k'$ will strike the outer end of the rack H, checking the further rotation of the breech-block. At the same time the hand-lever will bring up against the shoulder $g$ of the block G, and the hand-lever and the carrier C, as well as all the parts carried by the said carrier, will swing as one mass about the bolt E until the breech mechanism is in the open position and the gun may be loaded.

In order to lock the breech-block in the carrier after it has become disengaged from the screw-box, any well-known locking device may be provided; but I prefer the form of device hereinafter described.

$B^6$ is a stud which is secured to the rear face of the breech-block, which is rounded on two sides and provided on the opposite sides with flat faces, one of which is indicated by $b^7$. Q represents a spring plunger or latch having the cam-arm $q$, (see Figs. 3 and 14,) projecting upward, and inward and the holding-lug $q'$, which lug engages in a recess either in the gun-body or in a plate or housing W, secured to the gun-body, when the breech is closed. This lug $q'$ is normally pressed outward by means of the spring $q^2$. When the breech-block is rotated to the unlocked position, the lug $B^6$ engages the cam-arm $q$ and withdraws the latch Q, releasing the lug $q'$ from engagement with the gun-body and allowing the hinged carrier to be swung outward. As the hinged carrier swings back the inclined face $q^7$ of a second plunger or catch Q' slides along the inclined face $q^8$ of a lug $Q^2$, fast to the gun-body, (see Fig. 10,) and the shoulder $q^5$ of this catch Q' projects over the face $b^7$ of the lug $B^6$, and thus locks the breech-block against rotation backward in the hinged carrier so long as the hinged carrier is clear of engagement with the breech of the gun. This spring-catch Q' has a limited motion in guideways in the hinged carrier C, as indicated in Fig. 15, and is normally pressed back by the spring $q^4$. When the hinged carrier is swung forward to the closed position, the lug $Q^2$ projects into the opening $q^6$ in the spring-catch Q' and the cam-face $q^7$ engages the cam-face $q^8$, causing the catch Q' to be drawn outward until the shoulder $q^5$ is clear of the flattened face $b^7$ of the stop $B^6$. At this time the breech-block will be ready for rotation to the locked position, and the motion of the hand-lever from the position 3 to the position 1 (see Fig. 4) will rotate the breech-block, causing the screw-threads $b^2$ to engage the screw-threads $a^2$. As soon as the lug $B^6$ passes clear of the cam-arm $q$ of the latch Q the latter will move outward and lock the hinged carrier to the gun-body. Thus it will be seen that by a simple motion of the hand-lever in one direction the breech-block is unlocked from the screw-box, is locked on the carrier, and the latter is unlocked from the gun and is swung outward until the breech is open, while a motion of the hand-lever in the reverse direction will reverse this cycle of operation and will close the breech.

In order to prevent any rotation of the breech-block in the screw-box due to the pressure of the gases when the gun is fired and also to prevent premature discharge, I provide an auxiliary lock, which will now be described.

M represents a sliding bar having a rounded head M' and traveling in a suitable guideway in the hinged carrier. This head M' projects into the recess $b^5$, either in the breech-block B or in the wear-block $B^5$, set in the breech-block, as has been described and as shown in Figs. 5, 6, and 8. This block may be secured in place in any convenient way, as by means of the screw $b^6$. (See Fig. 5.) The outer side of this head engages in a corresponding recess in the gun-body, and thus this sliding bar M serves as a feather or spline engaging partly in the breech-block and partly in the gun-body and locks the breech-block firmly against rotation when this sliding bar is in the forward position, as indicated in Fig. 2. The corresponding recess in the gun-body may be made either in the gun-body itself, in the housing A', or in a separate wear-block $A^5$, let into the housing A', as shown in Figs. 2 and 4. In case a separate block be used, this should preferably be made of hardened material, similar to the block $B^5$, already described in connection with the breech-block. The sliding bar M is withdrawn by the first motion of the hand-lever rearward in opening the breech and is pressed home by the last motion of the hand-lever in closing the breech—that is, it is withdrawn when the hand-lever moves from the position indicated by the dotted lines 1 1 to that indicated by the dotted lines 2 2 in Fig. 4, and the reverse in closing—during which time there is no rotation of the block, due to the location of the centers of the toggle-joint motion and some very little lost motion.

In the modification shown in Fig. 35 instead of the sliding bar M an arm $F^3$ is shown, projecting forward into the curved slot partly in the breech-block and partly in the screw-box, which curved arm is on a radius struck with a center $F^2$, and it will be obvious that when the hand-lever is drawn to the rear, as indicated in dotted lines in Fig. 35, the engaging arm $F^3$ will be withdrawn from engagement either with the screw-box or with the breech-block and that the latter may turn in the screw-box, and therefore the modification shown in Fig. 35 illustrates the simplest form of spline adapted to lock the breech-block against rotation in the screw-box; but in the other device the sliding bar M is moved longitudinally during a short portion only of the travel of the hand-lever, and how this longitudinal motion of the sliding bar is effected will now be described; but as the sliding bar M also serves as a safety device to prevent the gun from being prematurely fired, it had best be described in connection with the firing mechanism, by means of which the gun may be fired either by mechanical means or by electricity.

Since it is desirable to rapidly substitute the electric for the mechanical firing device, and vice versa, I preferably construct these parts so that the substitution may be made with as little change as practicable. With this end in view certain of the operative parts are insulated, as shown in Figs. 8 and 31 to 34, inclusive. R represents the firing-pin, having the point $r$ projecting through the open hole $b^0$ in the nose of the breech-block, the point of which pin is made somewhat smaller in diameter than the said hole and concentric therewith, so that when the pin strikes the primer of the cartridge-case there shall be an annular space filled with air interposed between said pin and the conducting material of which the breech-block is composed. Insulated from this firing-pin R is the sleeve $R^3$, which travels in the recess $B^0$ in the stem $B^4$ of the breech-block, and this sleeve and the firing-pin contained therein are normally pressed forward by means of the spring $r'$, which is held against rearward motion by means of the insulated cup $r^4$, held in the cap $c^4$, secured in the boss $C^4$, projecting from the rear of the hinged carrier. To the rear end of the firing-pin I preferably secure the shank R', having the handle $R^2$, for cocking by hand, if desired; but this is unnecessary and may be omitted without disturbing the electrical circuit. The sleeve $R^3$ has an annular shoulder $r^3$ to engage the sear S, which is normally pressed toward the firing-pin by means of the coil-spring S'. The sear is also provided with a small recess $s$, in which the point of the screw $s'$ may be made to project, and thus lock the sear in the rearward position out of engagement with the annular shoulder when it is desired to fire by electricity. From an inspection of Fig. 8 it will be seen that after the gun be fired the firing-pin will plunge forward and remain in the forward position until the breech-block be turned to unlock the same from the screw-box. Then the block and firing-pin will be moved bodily backward by the screw-threads $b'$ and $d^2$ until, just as the breech-block approaches closest to the hinged carrier, the sear snaps under the annular shoulder $r^3$ on the firing-pin and holds the same cocked during the return of the breech-block to the locked position. Thus the firing-pin is automatically cocked and is released only when the sear is withdrawn. T represents a sliding bar having a shoulder $t$ engaging the sear after drawing the latter to the rear, as in firing the gun, which bar is normally pressed forward by means of the spring $t'$ bearing at one end against a shoulder of the said bar and at the other end on a fixed stop $p^7$. The sear and sliding bar T are mounted in the housing P, (see Figs. 8 and 18 to 20,) which housing is provided with ribs $p^5$ to engage in guideways $C^5$ in the rear face of the carrier, (see Figs. 9 and 15,) and the inward motion of this housing P is limited by the vertical face $c^5$. (See Figs. 9 and 15.) The rear end of this bar T terminates in a hook $t^2$ to engage the trigger U, which is drawn back by means of the cam-face $v$ of the wedge-block V engaging the cam-face $u'$ of the trigger U. This trigger is normally pressed inward by means of the spring $u$, while the wedge-block V is normally pressed rearward by the spring $v^4$ and is drawn forward by the firing-lanyard (not shown) engaging in the eye $v^2$. Thus it will be seen that pulling forward on this eye $v^2$ will draw the bar T outward, drawing the sear S clear of engagement with the annular shoulder $r^3$ of the sleeve $R^3$ and releasing the firing-pin, which springs forward under the action of the spring $r'$. The trigger U and block V are preferably mounted in the housing W, which may be left open to the rear, as at $w$, for convenience in assembling the parts. This housing W is connected to the gun-body in any convenient way and is provided with a binding-post $w^2$, connected to the metal block $x$ at one end of the conducting-plunger $x'$, (see Figs. 33 and 34,) which plunger is normally pressed against the conducting-strip $x^2$, which bears against the spring-distended conductor $M^2$, mounted in the locking-bar M, which makes contact when the breech is closed and locked by means of the strip $x^3$ with the conducting-screw $x^4$ and the insulated cup $r^4$ in contact with the spring $r'$, and thus electric connection, insulated from the gun-body and the parts connected therewith, is provided between the binding-post $w^2$ and the firing-pin R. The sliding bar T is provided with a lug $t$ to engage the back of the sear, with an opening $t^7$ to receive the cross-piece $p^7$, against which the spring $t'$ bears, and with a groove $t^6$, in which the locking-bar M travels when not in the locked position. Thus the locking-bar is drawn at right angles to the bar T and in a groove therein and prevents this bar from being moved, and consequently prevents the gun from being fired by mechanical means when the locking-bar is in the forward or locked position. When in this position, the shoulder $m'$ on the locking-bar clears the bar T, (see Fig. 6,) and the said bar T is free to move longitudinally. The spring-distended contact $M^2$ is mounted in the opening $m^2$ in the bar M (see Fig. 32) and is insulated from said bar, and this contact $M^2$ is so arranged that it will make connection between the conducting-strips $x^2$ and $x^3$ only when the bar M is in the forward or locked position. If it be out of this position, any current from the binding-post $w^2$ would pass through the body of the bar M to the hinged carrier and thence to the gun without making the circuit through the electric primer; but when the parts are in the position shown in Fig. 34 the current from the binding-post will pass through the conductors $x$ $x'$ $x^2$, $M^2$, $x^3$, and $x^4$ to the insulated cup $r^4$, thence to the firing-pin R and through the point of the firing-pin, which, as has already been stated, is insulated from the sides of the hole $b^0$ by means of the surrounding air, to the electric primer. Thus the gun may be fired by electricity only when the locking-bar M is in the forward or locked position. When firing by electricity, the sear is held back by the screw $s'$. Having thus described the coöperation of this locking-bar M with the firing mechanism, I will now describe the means by which the bar is moved backward from the locked to the unlocked position and is returned forward from the unlocked to the locked position automatically by the hand-lever.

Referring now to Figs. 6, 29, and 30, N represents a spring-catch having the cross-head $n$, adapted to engage the cam-surfaces $p$ and $p^2$ of the housing P. This catch is provided with a shank $n'$ and a nut $n^2$ and is normally pressed upward or into engagement with the locking-bar M by means of the spring $N'$, mounted in a hollow boss $f'$ on the hand-lever F. Suppose the locking-bar M to be in the position shown in Figs. 6 and 8 and the hand-lever to be started to the rear. The first motion of the hand-lever will draw the locking-bar M rearward, at the same time causing the cross-head $n$ to ride down the cam-face $p^2$ on the housing P, and thus will gradually disengage the cross-head $n$ from the recess $m$ in the locking-bar M until when the hand-lever reaches the position indicated by the numeral 2 in Fig. 4 the cross-head $n$ will be entirely out of engagement with the locking-bar M, and the hand-lever may be swung rearward without further disturbing the locking-bar. At this time the locking-bar is drawn out of locking engagement between the breech-block and the screw-box in the gun, and the breech-block is free to rotate about its axis. The first slight motion of the hand-lever to the rear will be insufficient to give any appreciable rotation to the breech-block, due to the location of the centers of the toggle-joint motion, and therefore it will only be necessary to provide very little lost motion between the end of the rack and the operating-face of the segment $k'$ to enable the locking-bar to be withdrawn sufficiently far to the rear before the rotation of the block on its axis is begun. To prevent the locking-bar M from being too suddenly thrown to the rear and becoming misplaced, I provide a shoulder $m'$ on the back of the locking-bar, engaging a corresponding shoulder $p'$ on the housing P, (see Fig. 6,) and thus the rearward travel of the locking-bar is limited. It will be seen that in closing the breech, as the hand-lever is swung from the position marked 3 to that marked 2 in Fig. 4, the cross-head $n$ is brought into contact with the cam-face $p$ of the housing P, and further movement of the hand-lever causes the cross-head to ride down this cam $p$ until it passes onto the cam $p^2$, when the spring $N'$ presses the cross-head $n$ upward, projecting the same into the recess $m$ in the under side of the locking-bar and causing this cross-head to force the locking-bar forward into the locked position, returning the parts to the position shown in Fig. 6. Thus it will be seen that the first rearward motion of the hand-lever will draw the locking-bar to the rear out of engagement and then release the same, leaving the hand-lever free to continue its travel about its pivot $F^2$, while in closing the breech the last part of the movement of the hand-lever will move the locking-bar into the forward or locked position. Since the gun cannot be fired until the locking-bar is in the forward or closed position, it will be seen that the last part of the movement of the hand-lever, after the screw-threads $b^2$ and $a^2$ are in complete engagement, will be to move this locking-arm forward and put the parts in such position that the gun can be fired, while the first part of the motion of the hand-lever in opening the breech will be to put the parts of the firing mechanism in such position that the gun cannot be fired, and therefore the locking-bar M forms part of the automatic means by which the ordinary danger from premature firing is absolutely eliminated.

Where it is desired to use fixed ammunition, the side wall of the gun may be slotted, as at $A^0$, for the insertion of the extractor $y$, pivoted on a bolt and having the rearwardly-extending arm $y'$ and the stop-shoulder $y^2$. (See Fig. 2.) This extractor is operated by means of the cam-plate Z, made fast to the hinged carrier, as by means of the stud $z$, and is provided with a cam-face $z'$ and a stop-face $z^2$, so that as the breech is swung open there is a slow motion of the extractor about its pivot to start the projectile, during which time great power will be exerted, and after the cartridge-case has once been released from its seat the quicker motion of extracting is set up, the advantages of which are well known in the art. Any other form of extractor may be used, preferably one which is carried or actuated by the plug itself, so that the gun-body need not be cut at all. As soon as the hinged carrier has been swung far enough to the rear the shoulder $y^2$ brings up against the face of the gun, and the block Z stops the further outward motion of the carrier; but this outward motion may be arrested in any other preferred way.

While I have described the invention in detail, it will be obvious that many of the parts may be changed in construction and other of the parts may be wholly omitted and that many structural changes may be made by any one skilled in the art without departing from the spirit of my invention.

By having the bar M project into and lock the breech-block against rotation it is possible to make the pitch of the screw-threads greater; but any other suitable means for holding the breech-block against rotation may be adopted, if desired, or friction alone depended upon.

I am aware that breech-blocks have been constructed in which a single spiral thread or single series of spiral threads is cut on the outer surface of the frustum of a cone—such, for instance, as are shown in the British patent to Silverman and Dawson, No. 1,550, dated January 19, 1898; but this arrangement lacks the series of spiral steps found in my invention, with the threads cut on these steps, and therefore requires to be turned through a considerably larger angle than with my invention to lock or unlock the same, thus occasioning a loss of time, which is of critical importance in a modern rapid-fire gun. With my improved breech-block housing, therefore, it is possible to lock or unlock the block by simply rotating the same through an angle of less than ninety degrees, when the block is in position to be withdrawn to the rear; but in practice I prefer to make the slope of the spirals and of the screw-threads less steep and to allow the block to lock and unlock after turning about one hundred and twenty to one hundred and eighty degrees.

While it is desirable, whenever practicable, to have the parts subjected to wear lined or faced with hardened material, I do not mean to limit my invention to such construction.

It will be evident that the engagement of the threads $a^2$ and $b^2$ being continuous the great loss of strength incident to ordinary mutilation of the threads of the breech-block and of the screw-box is avoided and that far greater strength, with corresponding lightness of parts, is secured. Moreover, the threads $b^2$ and $a^3$ become engaged and disengaged almost instantaneously, and after the first act of starting all the friction of turning the block is transferred to the boss $D^2$ and sleeves $B'$ and $B^4$ until the block is brought back to the final position in locking.

A feature of my invention is the facility by which the electrical firing mechanism may be substituted for the mechanical, or vice versa, it being only necessary to draw back the sear and run in the screw $s'$ far enough to hold the sear back, or the reverse. Another feature is the insulation of the firing-spring and the use of it as part of the electrical circuit.

Having thus described my invention, what I claim, and desire to secure by Letters Patent of the United States, is—

1. In a breech-loading gun, the combination with a breech-block substantially in the form of a frustum of a cone but having its engaging surface divided up into a series of spiral steps, with a plurality of screw-threads cut on each of said spiral steps, of a screw-box having corresponding threads engaging those of the breech-block, substantially as described.

2. In a breech-loading gun, the combination with a breech-block substantially in the form of a frustum of a cone but having its engaging surface divided up into a series of spiral steps, with a plurality of continuous screw-threads cut on each of said spiral steps, of a screw-box having corresponding threads engaging those of the breech-block, substantially as described.

3. In a breech-loading gun, the combination with a breech-block substantially in the form of a frustum of a cone but having its engaging surface divided up into a series of spiral steps, with a plurality of continuous screw-threads cut on each of said spiral steps, of a screw-box having continuous threads similarly arranged to and engaging those of the breech-block, substantially as described.

4. In a breech-loading gun, the combination with a breech-block substantially in the form of a frustum of a cone but having its engaging surface divided up into a series of spiral steps, each step being substantially rectangular in cross-section, with a plurality of screw-threads cut on the exterior part of each of said spiral steps, of a screw-box having threads corresponding to and engaging those of the breech-block, substantially as described.

5. In a breech-loading gun, the combination with a breech-block substantially in the form of a frustum of a cone but having its engaging surface divided up into a series of spiral steps, each step being substantially rectangular in cross-section and one face being substantially perpendicular to the axis of the breech-block, with a plurality of screw-threads cut on each of said spiral steps, of a screw-box having corresponding threads engaging those of the breech-block, substantially as described.

6. In a breech-loading gun, the combination with a breech-block substantially in the form of a frustum of a cone but having its engaging surface divided up into a series of spiral steps, with a plurality of screw-threads cut on each of said spiral steps, and a screw-box having corresponding threads engaging those of the breech-block, of means for rotating said breech-block to lock and unlock the same, and for swinging said block into and out of the gun, substantially as described.

7. In a breech-loading gun, the combination with a breech-block substantially in the form of a frustum of a cone but having its engaging surface divided up into a series of spiral steps, with a plurality of continuous screw-threads cut on each of said spiral steps, and a screw-box having continuous threads similarly arranged to and engaging those of the breech-block, of means for rotating said breech-block to lock and unlock the same, and for swinging said block into and out of the gun, substantially as described.

8. In a breech-loading gun, the combination with a breech-block substantially in the form of a frustum of a cone but having its engaging surface divided up into a series of spiral steps, each step being substantially rectangular in cross-section, and one face being substantially perpendicular to the axis of the breech-block, with a plurality of screw-threads cut on each of said spiral steps, and a screw-box having corresponding threads engaging those of the breech-block, of means for rotating said breech-block to lock and unlock the same, and for swinging said block into and out of the gun, substantially as described.

9. In a breech-loading gun, the combination with a breech-block substantially in the form of a frustum of a cone but having its engaging surface divided up into a series of spiral steps, with a plurality of continuous screw-threads cut on each of said spiral steps, and a screw-box having corresponding threads engaging those of the breech-block, of a hand-lever and mechanism operated thereby, for first rotating the breech-block about its axis in unlocking, and then swinging the same to the rear, or vice versa, substantially as described.

10. In a breech-loading gun, the combination with a breech-block substantially in the form of a frustum of a cone but having its engaging surface divided up into a series of spiral steps, each step being substantially rectangular in cross-section, with a plurality of screw-threads cut on the exterior part of each of said spiral steps, and a screw-box having threads corresponding to and engaging those of the breech-block, of a hand-lever and mechanism operated thereby, for first rotating the breech-block about its axis in unlocking, and then swinging the same to the rear, or vice versa, substantially as described.

11. As an article of manufacture, a breech-block substantially conical in general shape but having its engaging surface divided up into a series of spiral steps, with a plurality of screw-threads cut on each of said spiral steps, substantially as described.

12. As an article of manufacture, a breech-block substantially conical in general shape but having its engaging surface formed as of a ribbon wound spirally, longitudinally and radially, with a plurality of screw-threads cut thereon, the convolutions of said ribbon forming a series of steps, substantially as described.

13. As an article of manufacture, a breech-block substantially conical in general shape but having its engaging surface formed as of a ribbon wound spirally, longitudinally and radially, with a plurality of continuous screw-threads cut thereon, the convolutions of said ribbon forming a series of steps, substantially as described.

14. In a breech-loading gun, the combination with a breech-block substantially conical in general shape but having its engaging surface divided up into a series of spiral steps, with a plurality of screw-threads cut on each of said spiral steps, of a screw-box having threads registering with those on the breech-block, a hinged carrier, a rack mounted on said carrier, a pinion held against rotation on the breech-block and engaging said rack, and a hand-lever operating said rack and hinged carrier, substantially as described.

15. In a breech-loading gun, the combination with a breech-block substantially conical in general shape but having its engaging surface divided up into a series of spiral steps, with a plurality of screw-threads cut on each of said spiral steps, of a screw-box having threads registering with those on the breech-block, a hinged carrier, a rack mounted on said carrier, a segmental pinion held against rotation on the breech-block and having a segment projecting beyond its teeth and engaging the ends of said rack, and teeth engaging the teeth of said rack, and means for moving said rack and for swinging said carrier, substantially as described.

16. In a breech-loading gun, the combination with a breech-block substantially conical in general shape but having its engaging surface divided up into a series of spiral steps, with a plurality of screw-threads cut on each of said spiral steps, of a screw-box having threads registering with those on the breech-block, a hinged carrier, a rack mounted on said carrier, a pinion held against rotation on the breech-block and engaging said rack and a hand-lever operating said rack and hinged carrier, with a locking-bar engaging said block and holding same against revolution in the screw-box, when the breech is closed, substantially as described.

17. In a breech-loading gun, the combination with a breech-block substantially conical in general shape but having its engaging surface divided up into a series of spiral steps, with a plurality of screw-threads cut on each of said spiral steps, of a screw-box having threads registering with those on the breech-block, a hinged carrier, a rack mounted on said carrier, a segmental pinion held against rotation on the breech-block and having a segment projecting beyond its teeth and engaging the ends of said rack, and teeth engaging the teeth of said rack, and means for moving said rack and for swinging said carrier, with a locking-bar engaging said block and holding same against revolution in the screw-box, when the breech is closed, substantially as described.

18. In a breech-loading gun, the combination with a breech-block substantially conical in general shape but having its engaging surface divided up into a series of spiral steps, with a plurality of screw-threads cut on each of said spiral steps, of a screw-box having threads registering with those of the breech-block, a carrier for the breech-block, a rack mounted on said carrier, a pinion held against rotation on the breech-block and engaging said rack, a hand-lever operating said rack and carrier, firing mechanism, and a combined locking-bar and safety device engaging said block and holding same against revolution in the screw-box when the breech is closed, and also interrupting the action of the firing mechanism at all times except when the breech is closed and the locking-bar in locking engagement, substantially as described.

19. In a breech-loading gun, the combination with a breech-block substantially conical in general shape but having its engaging surface divided up into a series of spiral steps, with a plurality of screw-threads cut on each of said spiral steps, of a screw-box having threads registering with those of the breech-block, means for rotating said breech-block, and for withdrawing same from the screw-box, firing mechanism, and a combined locking-bar and safety device engaging said block and holding same against revolution in the screw-box when the breech is closed, and also interrupting the action of the firing mechanism at all times except when the breech is closed and the locking-bar in locking engagement, substantially as described.

20. In a breech-loading gun provided with a screw-box, a breech-block having screw-threads registering with those of the screw-box, means for rotating said breech-block to unlock the same from the screw-box, and means for withdrawing the breech-block from the screw-box, firing mechanism, and a combined locking-bar and safety device engaging said block and holding same against revolution in the screw-box when the breech is closed, and also interrupting the action of the firing mechanism at all times except when the breech is closed and the locking-bar in locking engagement, substantially as described.

21. In a breech-loading gun, the combination with a breech-block substantially in the form of a frustum of a cone but having its engaging surface divided up into a series of spiral steps, with a plurality of screw-threads cut on each of said spiral steps, a screw-box having corresponding threads engaging those of the breech-block, with means for rotating said breech-block to lock and unlock the same, and for swinging said block into and out of the gun, firing mechanism mounted partly in said block, and a combined locking-bar and safety device engaging said block and holding same against revolution in the screw-box when the breech is closed, and also interrupting the action of the firing mechanism at all times except when the breech is closed and the locking-bar in locking engagement, substantially as described.

22. In a breech-loading gun, the combination with a breech-block substantially in the form of a frustum of a cone but having its engaging surface divided up into a series of spiral steps, with a plurality of continuous screw-threads cut on each of said spiral steps, a screw-box having continuous threads similarly arranged to and engaging those of the breech-block, with means for rotating said breech-block to lock and unlock the same, and for swinging said block into and out of the gun, firing mechanism mounted partly in said block, and a combined locking-bar and safety device engaging said block and holding same against revolution in the screw-box when the breech is closed, and also interrupting the action of the firing mechanism at all times except when the breech is closed and the locking-bar in locking engagement, substantially as described.

23. In a breech-loading gun, the combination with a breech-block substantially in the form of a frustum of a cone but having its engaging surface divided up into a series of spiral steps, each step being substantially rectangular in cross-section, and one face being substantially perpendicular to the axis of the breech-block, with a plurality of screw-threads cut on each of said spiral steps, a screw-box having corresponding threads engaging those of the breech-block, with means for rotating said breech-block to lock and unlock the same, and for swinging said block into and out of the gun, firing mechanism mounted partly in said block, and a combined locking-bar and safety device engaging said block and holding same against revolution in the screw-box when the breech is closed, and also interrupting the action of the firing mechanism at all times except when the breech is closed and the locking-bar in locking engagement, substantially as described.

24. In a breech-loading gun, the combination with a breech-block substantially in the form of a frustum of a cone but having its engaging surface divided up into a series of spiral steps, with a plurality of continuous screw-threads cut on each of said spiral steps, a screw-box having corresponding threads engaging those of the breech-block, with a hand-lever and mechanism operated thereby, for first rotating the breech-block about its axis in unlocking, and then swinging the same to the rear, or vice versa, firing mechanism mounted partly in said block, and a combined locking-bar and safety device engaging said block and holding same against revolution in the screw-box when the breech is closed, and also interrupting the action of the firing mechanism at all times except when the breech is closed and the locking-bar in locking engagement, substantially as described.

25. In a breech-loading gun, the combination with a breech-block substantially in the form of a frustum of a cone but having its engaging surface divided up into a series of spiral steps, each step being substantially rectangular in cross-section, with a plurality of screw-threads cut on the exterior part of each of said spiral steps, a screw-box having threads corresponding to and engaging those of the breech-block, with a hand-lever and mechanism operated thereby, for first rotating the breech-block about its axis in unlocking, and then swinging the same to the rear, or vice versa, firing mechanism mounted partly in said block, and a combined locking-bar and safety device engaging said block and holding same against revolution in the screw-box when the breech is closed, and also interrupting the action of the firing mechanism at all times except when the breech is closed and the locking-bar in locking engagement, substantially as described.

26. In a breech-loading gun, the combination with a breech-block substantially conical in general shape but having its engaging surface divided up into a series of spiral steps, with a plurality of screw-threads cut on each of said spiral steps, of a screw-box having threads registering with those on the breech-block, a hinged carrier, a rack mounted on said carrier, a pinion held against rotation on the breech-block and engaging said rack, a hand-lever operating said rack and hinged carrier, firing mechanism mounted partly in said block and a combined locking-bar and safety device engaging said block and holding same against revolution in the screw-box when the breech is closed, and also interrupting the action of the firing mechanism at all times except when the breech is closed and the locking-bar in locking engagement, substantially as described.

27. In a breech-loading gun, the combination with a breech-block substantially conical in general shape but having its engaging surface divided up into a series of spiral steps, with a plurality of screw-threads cut on each of said spiral steps, of a screw-box having threads registering with those on the breech-block, a hinged carrier, a rack mounted on said carrier, a segmental pinion held against rotation on the breech-block and having a segment projecting beyond its teeth and engaging the ends of said rack, and teeth engaging the teeth of said rack, means for moving said rack and for swinging said carrier, firing mechanism mounted partly in said block and a combined locking-bar and safety device engaging said block and holding same against revolution in the screw-box when the breech is closed, and also interrupting the action of the firing mechanism at all times except when the breech is closed and the locking-bar in locking engagement, substantially as described.

28. In a breech-loading gun, the combination with a breech-block with screw-threads thereon, of a screw-box having threads registering with those on the breech-block, a hinged carrier, a rack mounted on said carrier, a pinion held against rotation on the breech-block and engaging said rack and a hand-lever operating said rack and hinged carrier, with a locking-bar operated by said hand-lever engaging said block and holding same against revolution in the screw-box, when the breech is closed, substantially as described.

29. In a breech-loading gun, the combination with a breech-block with screw-threads thereon, of a screw-box having threads registering with those on the breech-block, a hinged carrier, a rack mounted on said carrier, a segmental pinion held against rotation on the breech-block and having a segment projecting beyond its teeth and engaging the ends of said rack, and teeth engaging the teeth of said rack, and means for moving said rack and for swinging said carrier, with a locking-bar operated by said hand-lever and engaging said block and holding same against revolution in the screw-box, when the breech is closed, substantially as described.

30. In a breech-loading gun, the combination with a breech-block with screw-threads thereon, of a screw-box having threads registering with those of the breech-block, a carrier for the breech-block, a rack mounted on said carrier, a pinion held against rotation on the breech-block and engaging said rack, a hand-lever operating said rack and carrier, firing mechanism, and a combined locking-bar and safety device engaging said block and holding same against revolution in the screw-box when the breech is closed, and also interrupting the action of the firing mechanism at all times except when the breech is closed and the locking-bar in locking engagement, substantially as described.

31. In a breech-loading gun, the combination with a breech-block with screw-threads thereon, of a screw-box having threads registering with those of the breech-block, means for rotating said breech-block, and for withdrawing same from the screw-box, firing mechanism, and a combined locking-bar and safety device engaging said block and holding same against revolution in the screw-box when the breech is closed, and also interrupting the action of the firing mechanism at all times except when the breech is closed and the locking-bar in locking engagement, substantially as described.

32. In a breech-loading gun provided with a screw-box, of a breech-block having screw-threads registering with those of the screw-box, means both for rotating said breech-block to unlock the same from the screw-box and for withdrawing the breech-block from the screw-box, firing mechanism, and a safety device engaging said block and holding the same against revolution in the screw-box when the breech is closed, and also interrupting the action of the firing mechanism at all times except when the breech is closed and the locking-bar in locking engagement, substantially as described.

33. In a breech-loading gun provided with a screw-box, of a breech-block having screw-threads registering with those of the screw-box, firing mechanism, a safety device engaging said block and holding same against revolution in the screw-box when the breech is closed, and also interrupting the action of the firing mechanism at all times except when the breech is closed and the locking-bar in locking engagement, and means for first releasing said safety device, then rotating said block to unlock the same, then swinging said block to the rear, then cocking said firing mechanism, and finally returning the block and safety device to the initial locked position, substantially as described.

34. In a breech-loading gun provided with a screw-box, of a breech-block having screw-threads registering with those of the screw-box, firing mechanism, a safety device engaging said block and holding same against revolution in the screw-box when the breech is closed, and also interrupting the action of the firing mechanism at all times except when the breech is closed and the locking-bar in locking engagement, a hand-lever and mechanism operated thereby, for releasing said safety device, then rotating said block to unlock the same thereby cocking said firing mechanism, then swinging said block to the rear, and finally returning the block and safety device to the initial locked position, substantially as described.

35. As an article of manufacture, a breech-block for breech-loading guns, having its engaging surface formed as of a ribbon wound spirally, radially and longitudinally and always parallel to the axis of the block, with a plurality of screw-threads cut thereon, substantially as described.

36. In a breech-loading gun, the combination with a breech-block having screw-threads thereon, of a screw-box having threads registering with those on the breech-block, a hinged carrier, a rack mounted on said carrier, a segmental pinion held against rotation on the breech-block and having a segment projecting beyond its teeth and engaging the ends of said rack, and teeth engaging the teeth on said rack, a hand-lever pivoted on said carrier, and a link connecting said hand-lever with said rack, substantially as described.

37. In a breech-loading gun, the combination with a breech-block having screw-threads thereon, of a screw-box having threads registering with those on the breech-block, a hinged carrier, a rack mounted on said carrier, a pinion held against rotation on the breech-block and engaging said rack, a link connected to said rack and a hand-lever connected to said link and operating said rack and hinged carrier, with a safety device also operated by said hand-lever for holding said block against revolution in the screw-box, when the breech is closed, substantially as described.

38. In a breech-loading gun, the combination with a breech-block having screw-threads thereon, of a screw-box having threads registering with those on the breech-block, a hinged carrier, a rack mounted on said carrier, a segmental pinion held against rotation on the breech-block and having a segment projecting beyond its teeth and engaging the ends of said rack, and teeth engaging the teeth of said rack, and means for moving said rack and for swinging said carrier, firing mechanism and a safety device for engaging said block and holding same against revolution in the screw-box, when the breech is closed and permitting the firing mechanism to be operated only at that time, substantially as described.

39. In a breech-loading gun, the combination with a breech-block having screw-threads thereon, of a screw-box having threads registering with those of the breech-block, a carrier for the breech-block, a rack mounted on said carrier, a pinion held against rotation on the breech-block and engaging said rack, a link connected to said rack, a hand-lever pivoted on said carrier and connected to said link for operating said rack and carrier, firing mechanism, and a safety device also operated by said hand-lever engaging said block and holding same against revolution in the screw-box when the breech is closed, and also interrupting the action of the firing mechanism at all times except when the breech is closed and the locking-bar in locking engagement, substantially as described.

40. In a breech-loading gun, the combination with a breech-block having screw-threads thereon, of a screw-box having threads registering with those of the breech-block, means for rotating said breech-block, and for withdrawing same from the screw-box, firing mechanism, and a safety device engaging said block and holding same against revolution in the screw-box when the breech is closed, and also interrupting the action of the firing mechanism at all times except when the breech is closed and locked, substantially as described.

41. In a breech-loading gun, the combination with a breech-block with screw-threads thereon, of a screw-box having threads registering with those of the breech-block, a carrier for the breech-block, a cam on said carrier, a hand-lever and mechanism operated by said hand-lever for opening and closing the breech, a locking-bar provided with a notch, and a spring-catch carried by the hand-lever and projecting into said notch when the breech is closed but engaging said cam when the hand-lever is nearly in the closed position, substantially as described.

42. In a breech-loading gun, the combination with a sliding locking-bar for locking the breech-block against turning in the screw-box; of a lever, a spring-catch carried by said lever, and engaging said locking-bar, and a cam disengaging said catch from said bar after said lever has traveled a short distance, substantially as described.

43. In a breech-loading gun, the combination with a sliding safety device for locking the breech-block against turning in the screw-box, and for preventing premature discharge, of a hand-lever for operating the breech mechanism and cocking the firing mechanism, a spring-catch carried by said hand-lever and engaging said safety device, and a cam located in the line of travel of said catch and disengaging the same from engagement with the safety device after the hand-lever has been moved a short distance, substantially as described.

In testimony whereof I affix my signature in presence of two witnesses.

FRANCIS J. HAESELER.

Witnesses:
GRAFTON L. MCGILL,
CLARENCE A. BATEMAN.